United States Patent [19]

Megeid

[11] Patent Number: 5,349,516
[45] Date of Patent: Sep. 20, 1994

[54] SWITCH MODE POWER SUPPLY WITH REDUCED INPUT CURRENT DISTORTION

[75] Inventor: Magdy Megeid, Zurich, Switzerland

[73] Assignee: RCA Thomson Licensing Corporation, Princeton, N.J.

[21] Appl. No.: 95,389

[22] Filed: Jul. 23, 1993

[30] Foreign Application Priority Data

Sep. 17, 1992 [GB] United Kingdom ............... 9219663
Dec. 18, 1992 [GB] United Kingdom ............... 9226381

[51] Int. Cl.$^5$ ........................................... H02M 3/335
[52] U.S. Cl. ........................................ 363/21; 363/97; 315/411; 348/730
[58] Field of Search ................ 363/16, 20, 21, 97, 363/131; 358/190; 315/411

[56] References Cited

U.S. PATENT DOCUMENTS

| | | | |
|---|---|---|---|
| 4,109,307 | 8/1978 | Knoll | 363/101 |
| 4,302,717 | 11/1981 | Olla | 323/282 |
| 4,315,305 | 2/1982 | Siemon | 363/88 |
| 4,459,651 | 7/1984 | Fenter | 363/21 |
| 4,564,897 | 1/1986 | Okamoto et al. | 363/132 |
| 4,680,511 | 7/1987 | Fitzgerald et al. | 315/411 |
| 4,689,730 | 8/1987 | Kimura | 363/21 |
| 4,761,723 | 8/1988 | Lendaro | 363/21 |
| 4,766,528 | 8/1988 | Marinus | 363/21 |
| 4,930,060 | 5/1990 | Leonardi | 363/21 |
| 4,975,592 | 12/1990 | Hahn et al. | 363/21 X |
| 4,975,823 | 12/1990 | Rilly et al. | 363/56 |
| 5,010,281 | 4/1991 | Rodriguez-Cavazos | 315/411 |
| 5,126,930 | 6/1992 | Ahn | 363/21 |
| 5,146,394 | 9/1992 | Ishii et al. | 363/16 |
| 5,161,241 | 11/1992 | Kanai | 363/65 |
| 5,189,600 | 2/1993 | Keck et al. | 358/190 X |

FOREIGN PATENT DOCUMENTS

58-141680 8/1983 Japan.

OTHER PUBLICATIONS

A publication by Siemens Semiconductor, Industrial ICs, dated Dec. 15, 1989 illustrating a switch mode power supply that includes a transistor T.
A publication entitled Power Supply Controls published by Unitrode Integrated Circuit.

Primary Examiner—Emanuel T. Voeltz
Attorney, Agent, or Firm—Joseph S. Tripoli; Joseph J. Laks; Sammy S. Henig

[57] ABSTRACT

In a switch mode power supply, a full wave rectified AC mains supply voltage is produced from an AC mains supply voltage without low-pass filtering. The unfiltered rectified voltage is applied to a winding of a flyback transformer that is coupled to a switching transistor. A first plurality of current pulses are generated in the winding from the rectified voltage at a frequency that is higher than the frequency of the mains supply voltage and at peak amplitudes that vary in accordance with the rectified voltage in a manner to increase a power factor. The rectified voltage is further rectified via a rectifier coupled in series with a resistor and a low-pass filter capacitor and produces current pulses in the capacitor. A voltage in the capacitor is coupled via a second switching transistor to the winding to produce in the winding a second plurality of current pulses that reduce a ripple component at an output of the power supply. The resistor increases the pulse-width and decreases the magnitude of the capacitor current pulses in a manner to reduce input harmonic contents and increase the power factor.

24 Claims, 7 Drawing Sheets

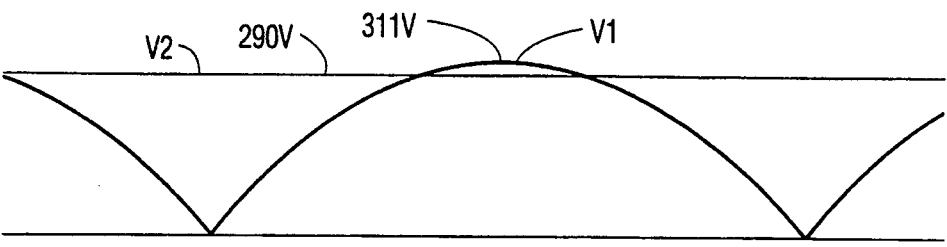
FIG. 2a
FIG. 2b
FIG. 2c
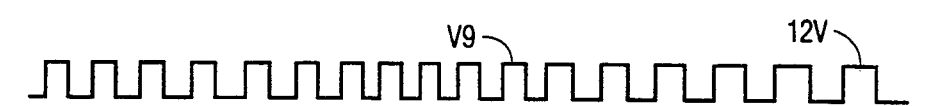
FIG. 2d
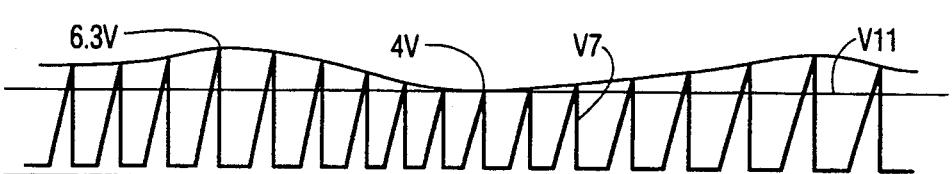
FIG. 2e
FIG. 2f
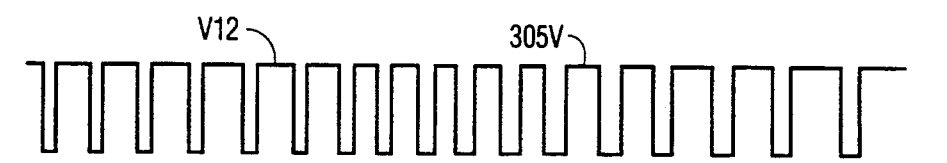
FIG. 2g
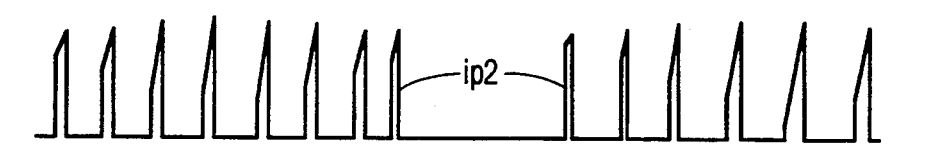
FIG. 2h
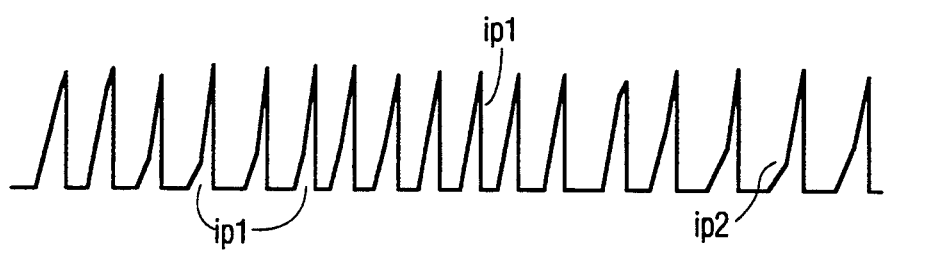

SWITCH MODE POWER SUPPLY WITH REDUCED INPUT CURRENT DISTORTION

The invention relates to a switch mode power supply SMPS). In particular, the invention relates to a SMPS that derives a rectified input supply voltage from an AC, mains supply voltage to produce an output supply voltage.

Typically, such SMPS employs a full wave rectifier bridge that rectifies a sinusoidal mains supply voltage and charges an input filter capacitor to produce the rectified input supply voltage. The filter capacitor has a sufficiently large value for reducing, in the input supply voltage, the magnitude of a ripple at the fundamental frequency and at the harmonics of the mains supply voltage. In this way, ripple voltage is prevented from occurring in the output supply voltage.

The filter capacitor draws narrow pulses of input current having a high peak value from the mains supply voltage source. The current pulses occur only in the vicinity of the peaks of the sinusoidal mains supply voltage. Therefore, the waveform of the input current contains undesirable low frequency harmonics of the mains supply voltage frequency. The result is an undesirable decrease in the power factor to about 0.65 and an undesirable increase in distortions of the waveform of the mains supply voltage.

Recently, an interest has evolved for revising European Standard EN60 555-2 for the purpose of reducing the permissible low frequency harmonic content of the waveform of the input current. It may be desirable to reduce the low frequency harmonic content of the waveform of the input current without significantly increasing a ripple voltage in the output supply voltage.

A switch mode power supply, embodying an aspect of the invention, includes a source of an AC, mains supply voltage. A first rectifier is coupled to the mains source for rectifying the mains supply voltage without filtering out a low frequency component at a frequency related to that of the mains supply voltage to develop an unfiltered, rectified, first supply voltage. A first switching arrangement is responsive to a first switching signal and coupled to an inductance having applied thereto the first supply voltage for developing a first plurality of current pulses at a frequency that is substantially higher than that of the mains supply voltage. The first plurality of current pulses are coupled via a second rectifier to produce a first portion of a rectified output supply current. A third rectifier is coupled to the mains source and to a filter capacitor for rectifying the mains supply voltage to develop current pulses in the capacitor for producing a rectified, second supply voltage in the capacitor. A second switching arrangement is coupled to the second supply voltage and responsive to a second switching signal for developing in an inductance that is coupled to the capacitor a second plurality of current pulses at a frequency that is substantially higher than that of the mains supply voltage. The second plurality of current pulses are coupled via a rectifier to produce a second portion of the output supply current. A pulse-width is lengthened and a peak amplitude is decreased of a given current pulse in the capacitor.

FIGS. 2a–2h illustrate waveforms useful for explaining the operation of the SMPS of FIG. 1;

Figure 1:
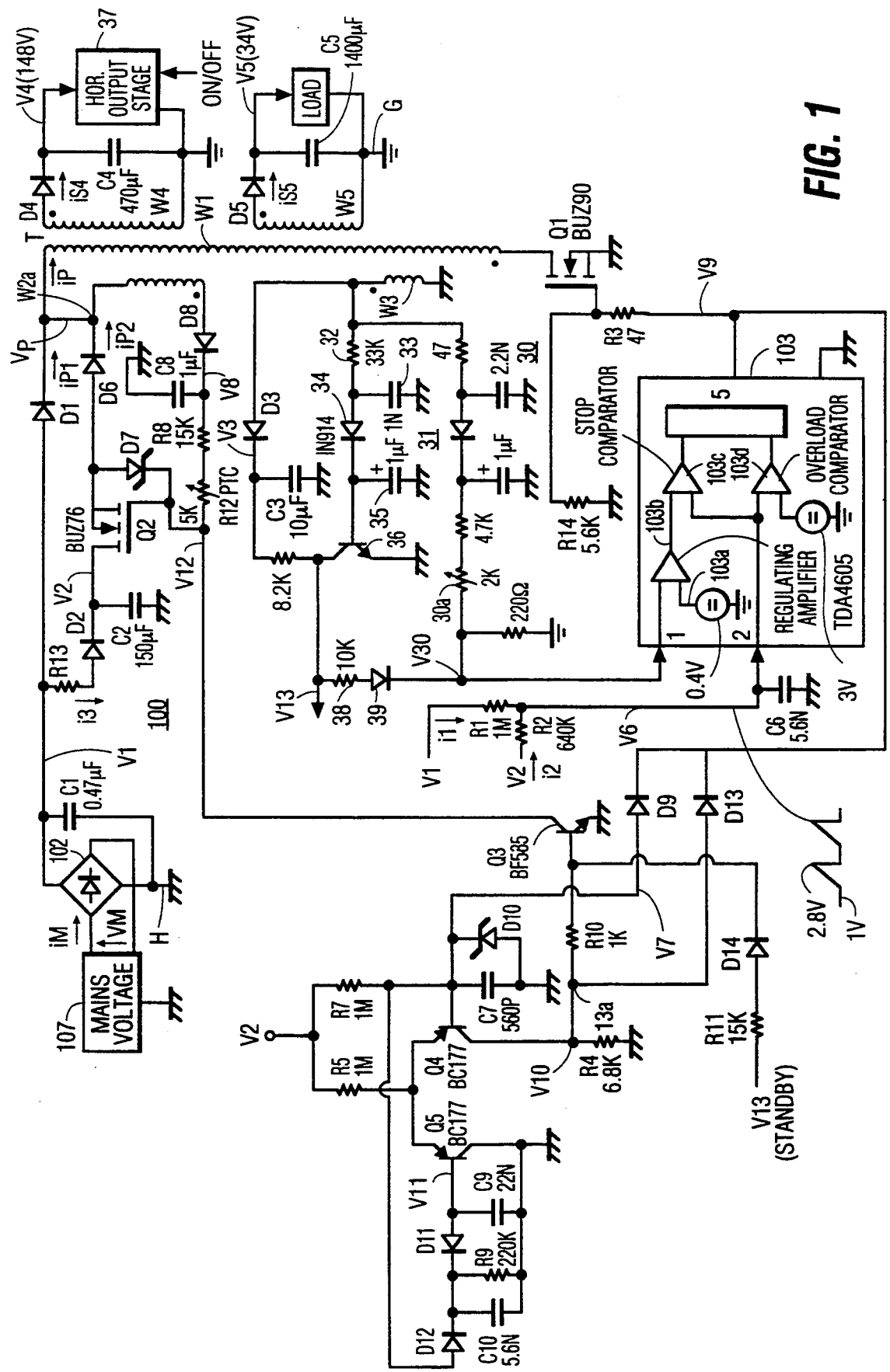
FIG. 1 illustrates an SMPS, embodying an aspect of the invention, that utilizes a current super-position technique.

FIG. 1 illustrates an SMPS 100, embodying an aspect of the invention, that utilizes a technique, referred to herein as current super-position technique. SMPS 100 of FIG. 1 is suitable for providing, for example, 120 watts power. A mains supply voltage source 107 that produces an AC voltage VM is coupled to a full-wave bridge rectifier 102 that produces an AC full-wave rectified input supply voltage V1 in a relatively small filter capacitor C1. AC voltage VM of source 107 is sinusoidal at, for example, a line frequency of 50 Hz. Because of the small capacitance of capacitor C1, low frequency harmonics of voltage V1 are not filtered out by capacitor C1. Voltage V1, having a waveform of an unfiltered, full wave rectified sinusoidal voltage, is coupled via a switching diode D1 to an end terminal W2a of a primary winding W1 of a flyback transformer T.

A switching signal V9, having a controllable frequency and duty cycle, is coupled via a resistor R3 to a resistor R14 and to a gate of an MOS switching transistor Q1 to turn on transistor Q1 only when signal V9 is at a HIGH level or 12 volts. The drain electrode of transistor Q1 is coupled to the other end terminal of winding W1. Signal V9 is developed at an output terminal of an integrated circuit (IC) 103 of the type TDA4605 operating as a pulse-width modulator. The frequency of signal V9 is selected to be within a range of 20–50 KHz.

In a given cycle of signal V9, after signal V9 attains the HIGH level, a pulse current ip1 flows through diode D1. An upramping current ip that is equal to current ip1 in diode D1 is produced in winding W1, storing magnetic energy in transformer T. Immediately after signal V9 changes from the HIGH to a LOW level, transistor Q1 becomes non-conductive and a flyback operation occurs. The result is that flyback pulse currents are produced in secondary windings W2, W3, W4 and W5 of transformer T. The drain voltage of transistor Q1 is limited, during flyback, by means of a snubber circuit, not shown.

As a result of flyback current pulses, such as a current pulse is4 in winding W4, that are produced from pulses ip, DC output supply voltages V3, V4, V5 and V8 are produced in capacitors C3, C4, C5 and C8 via rectifying diodes D3, D4, D5 and D8, respectively. Voltage V4 energizes, for example, a horizontal deflection output stage 37 and voltage V5 energizes, for example, an audio stage of a television receiver.

Transformer T isolates, with respect to electrical shock hazard, source 107 and a "hot" ground conductor, H, from a "cold" ground conductor G. Voltages V3 and V8 are referenced to hot ground conductor H. Whereas, voltages V4 and V5 are referenced to cold ground conductor G.

In normal operation, a DC sense voltage V30 that is indicative of, for example, voltage V4 is produced in a circuit 30 by filtering and rectifying the flyback pulses in winding W3 and voltage dividing. A resistor 30a is adjustable for adjusting the output supply voltages by the adjustment of voltage V30. Sense voltage V30 is applied to a sense input terminal, pin 1, of IC 103. Voltage V30 is compared in IC 103 with a reference voltage 103a. An error voltage 103b is produced from a difference between voltage V30 and reference voltage 103a. Error voltage 103b is coupled to an input of a stop comparator 103c to control a pulse-width or a HIGH-to-LOW transition of signal V9 to regulate the levels of output voltages V4 and V5.

Voltage V1 is also coupled via a series arrangement of a resistor R13, embodying an inventive feature, and a rectifying diode D2 to a filter capacitor C2 for producing a supply voltage V2 in capacitor C2. Voltage V2 is a constant, DC voltage that is proportional to the peak voltage of voltage V1. Voltage V2 is coupled via an MOS switching transistor Q2 and a switching diode D6, when transistor Q2 is conductive, to junction terminal W2a. Terminal W2a is coupled between diode D1 of winding W1 and a secondary winding W2 of transformer T.

DC voltage V8 developed, during flyback, via winding W2 is larger by about 15V than voltage V2. Voltage V8 is coupled to the gate of transistor Q2 via a resistor R8 and a resistor R12, coupled in series to turn on switching transistor Q2 when a transistor Q3 that is coupled to the gate of transistor Q2 is turned off. By being larger than voltage V2, voltage V8 is sufficient to turn on MOS transistor Q2. A protection diode D7 coupled between the source electrode and gate electrode of transistor Q2 limits gate-source voltage excursions of transistor Q2.

Signal V9 of FIG. 1 also controls the switching operation frequency of transistor Q2. To control the switching operation of transistor Q2, signal V9 of FIG. 1 is coupled via a diode D9 to a ramp generator that is formed by a resistor R7 and a capacitor C7. A zener diode D10 limits the maximum voltage of a ramp signal V7 in capacitor C7 to 9.1 volt. When signal V9 is HIGH, diode D9 is reverse biased and capacitor C7 is charged by means of voltage V2 through resistor R7. Consequently, signal V7 in capacitor C7 increases linearly. When signal V9 becomes LOW, diode D9 conducts and capacitor C7 is immediately discharged through the low impedance output formed at pin 5 of IC 103.

FIGS. 2a–2h illustrate waveforms useful for explaining the operation of the circuit of FIG. 1. Similar symbols and numerals in FIGS. 1 and 2a–2h indicate similar items or functions.

The pulse width of signal V9 of FIG. 1 determines the peak level of signal V7 that is developed in capacitor C7. Because the voltage that is coupled via diode D1 to winding W1 has a full wave rectified sinusoid waveform, the feedback signal to IC 103 causes the pulse width of signal V9 to vary as a function of full wave rectified voltage V1. Consequently, the peaks or envelope of signal V7 also varies as a function of voltage V1, during the 10 millisecond period of voltage V1, as shown in FIG. 2d. In FIG. 2d, for example, the ratio between the period of signal V7 and that of voltage V1 of FIG. 2a is exaggerated for better clarity.

Signal V7 of FIG. 1 is applied to an inverting input terminal of a comparator formed by a transistor Q4 and a transistor Q5. A resistor R5 produces emitter currents in transistors Q4 and Q5. A collector resistor R4 of transistor Q4 develops an output signal V10 at an output terminal 13a of the comparator.

Output signal V10 is coupled to the base of transistor Q3 to control switching operation of transistor Q3. The collector of transistor Q3 is coupled to a load arrangement formed by resistors R8 and R12 and energized by supply voltage V8 to develop a switching signal V12 at the gate of transistor Q2.

Immediately after the transition to the HIGH level of signal V9, diode D1 becomes conductive and current ip1 is generated. As long as transistor Q2 remains turned off, current ip2 is not generated. Transistor Q2 remains nonconductive as long as output signal V10 of the comparator is HIGH in a manner to turn on transistor Q3 and, thereby, to turn off transistor Q2. Each of primary current ip1 and signal V7 increases in an upramping manner after signal V9 becomes HIGH.

During a given switching period of signal V9, when signal V7 of FIG. 2d reaches a higher level than a threshold voltage V11 of the comparator, comparator output signal V10 of FIG. 2e changes from the HIGH to the LOW level. When signal V10 attains the LOW level, transistor Q3 of FIG. 1 is turned off and transistor Q2 is turned on by means of signal V12 of FIG. 2f.

When transistor Q2 becomes conductive, diode D6 of FIG. 1 becomes conductive causing diode D1 to become nonconductive. Therefore, input supply voltage V1 is decoupled from winding W1 and voltage V2 is coupled to winding W1 via transistor Q2. Primary current ip2 of FIG. 2g in diode D6 of FIG. 1 causes current ip to continue flowing without a gap of time from the time the pulse of current ip1 ceases, as shown in FIGS. 2g and 2h.

After a predetermined interval that is determined in accordance with voltage V30 by IC 103 of FIG. 1, signal V9 changes again to the LOW level that causes signal V7 to become LOW. Signal V9 is also coupled via a diode D13 to junction terminal 13a between resistor R4 and resistor R10. Diode D13 conduct when signal V9 is at the LOW level. Immediately after signal V9 becomes LOW, signal V10 of FIG. 2e is forced to be LOW because diode D13 of FIG. 1 conducts. Therefore, transistors Q1 and Q3 are turned off. Transistor Q2 does not conduct current although signal V12 at the collector of transistor Q3 is HIGH because transistor Q1 is turned off. Advantageously, because of the operation of diode D13, no current flows in resistors R8 and R12 when signal V9 is LOW. The resulting reduction in power dissipation is about 2,5 watts at 120 watts input power. Diodes D9 and D13 are turned off when signal V9 becomes HIGH and a new cycle begins.

Figure 3A:
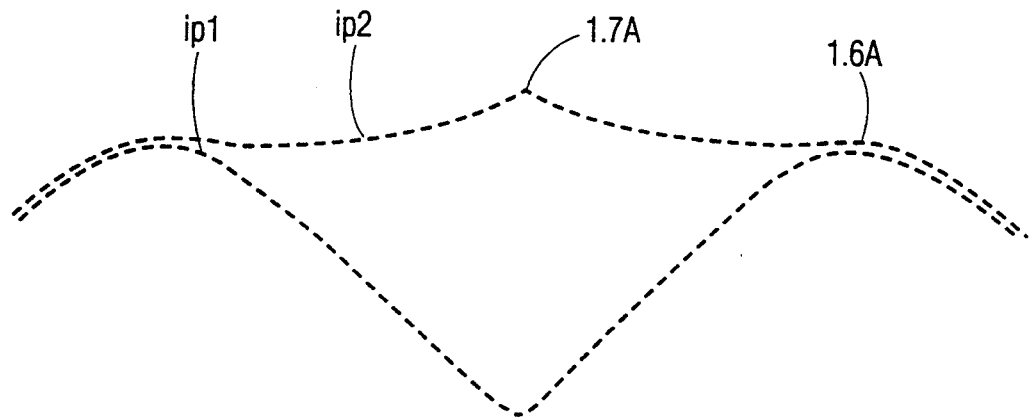
FIGS. 3a–3c illustrate additional waveforms useful for explaining the operation of the SMPS of FIG. 1.
Figure 3B:
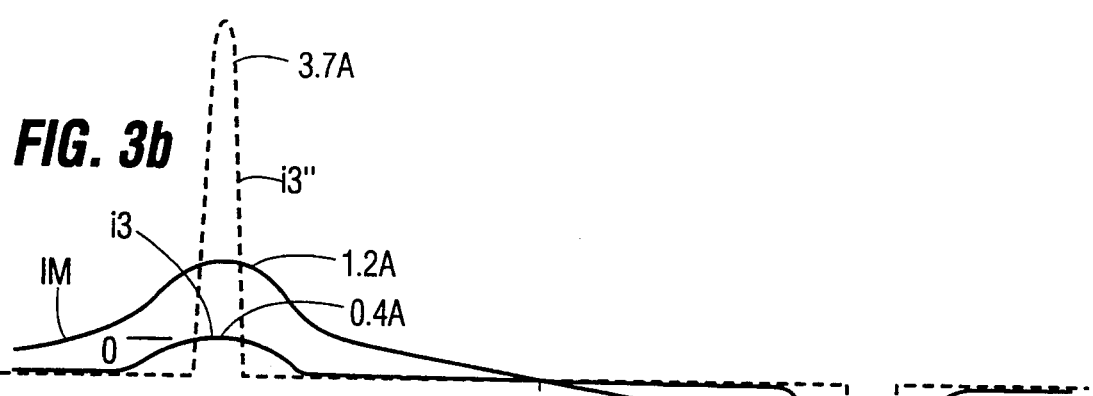
Figure 3C:
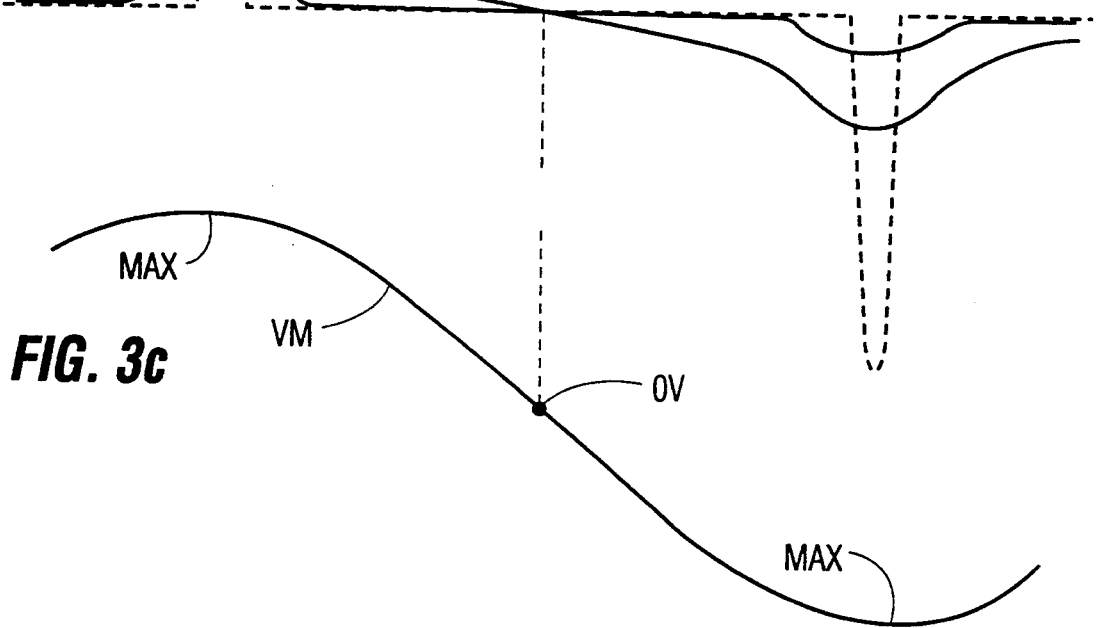

Primary current ip that is determined by the superposition of currents ip1 and ip2 is shown in FIG. 3a for a 100 watts input power. A resulting mains current iM has a waveform that is shown in FIG. 3b as a solid line. For comparison purposes, the broken line waveform in FIG. 3b corresponds to mains current iM" of a conventional power supply that includes a large filter capacitance at the output of the bridge rectifier for the same input power rate of a 100 watts. In each half-period of voltage VM, the peaks of the pulses of current ip1 vary predominantly in a sinusoidal manner at the fundamental mains frequency. Capacitor C2 is charged via resistor R13 only in the vicinity of the peaks of mains voltage VM.

In accordance with an inventive feature, resistor R13 causes an increase in the conduction interval of the diodes of bridge rectifier 102; thereby, resistor R13 reduces the rate of change and peak amplitude of charging current i3, as illustrated in FIG. 3b. Thus, advantageously, high harmonics content of current iM such as at the 3rd, 5th, 7th, 9th and 11th harmonics is reduced. The peak value of the pulses of current i3 is low, because the energy stored in capacitor C2 supplies only a portion of primary current ip. About 65% of the power consumption is obtained by means of current ip1 and 35% by means of current ip2.

Threshold voltage V11 controls the ratio between the pulse-width of the pulse of current ip2 and that of the pulse of current ip1. Because of a ripple voltage contained in voltage V30 during a given period of full wave rectified voltage V1, each of the pulse-width of pulse-width modulated signal V9 and the peak of signal V7 is approximately at a maximum when voltage V1 is zero and at a minimum when voltage V1 is at a maximum. To establish threshold voltage V11 for the comparator formed by transistors Q4 and Q5, signal V7 is coupled via a diode D12 to a parallel arrangement of a resistor R9 and a capacitor C10. A voltage developed in capacitor C10 varies in accordance with the low frequency envelope of the peaks of signal V7; whereas, the high frequency component is filtered out. The voltage in capacitor C10 is coupled via a diode D11 to a capacitor C9 and to a base electrode of transistor Q5. Diode D11 and capacitor C9 operate as a minimum level detector for detecting the minimum value of the envelope of the peaks of signal V7. A forward voltage in diode D12 is temperature compensated by the opposite forward voltage developed in diode D11. The envelope of the peaks of signal V7 varies as a function of voltage V1. Slice level or threshold voltage V11 that is developed in capacitor C9 is determined by the minimum pulse-width of signal V9 within a period of voltage V1. Voltage V11 is applied to the noninverting input of the comparator formed by transistors Q4 and Q5.

For constant loading, the level of voltage V11 is relatively constant. Therefore, the pulse-width of each of the pulses of current ip1 is the same. Whereas, advantageously, the pulse-width of the pulses of current ip2 varies from a maximum, when voltage V1 is zero, to a minimum, when voltage V1 is at a peak.

Increased loading, for example, causes, in each period of signal V9, an increase in the pulse-width of signal V9. Thus, the minimum pulse-width of signal V9 also increases that tends to cause an increase in voltage V11. The increase in voltage V11 tends to delay the instant, during each pulse of signal V9, when signal V10 becomes LOW, and, therefore, when transistor Q2 becomes conductive. The result is an increase in the pulse-width of the pulse of current ip1. Since the pulse-width of signal V9 also increases, a ratio between the length of the conduction interval of transistor Q2 and that of transistor Q1 tends to vary less than if, for example, voltage V11 were a constant voltage. Therefore, advantageously, the ripple voltage of output voltage V4 is less affected by loading variations than if voltage V11 were constant. It follows that the ratio between current i3 and ip1 varies less by loading. Therefore, the harmonic content of current iM or the power factor is also less affected by loading.

At a predetermined increased loading condition, the peak value of current i2 is limited. A further increased loading causes also the peak value of current i1 to be limited. An even further increased loading, such as a short circuit in the secondary side, results in a burst mode operation in IC 103.

In each cycle of signal V9, when signal V9 of FIG. 2c attains the HIGH level, capacitor C6 of FIG. 1 at pin 2 of IC 103 is charged by a current that is equal to a sum of a constant current i2, developed via a resistor R2 from voltage V2, and a current i1, having a full wave rectified sinusoid waveform, developed via a resistor R1 from voltage V1. When signal V9 of FIG. 2c is at the LOW level, voltage V6 of FIG. 2b is clamped to 1 volt, as determined by IC 103 of FIG. 1. When signal V9 of FIG. 2c attains the HIGH level, capacitor C6 of FIG. 1 develops ramping voltage V6, as shown in FIG. 2b. Because capacitor C6 is charged by means of current i1 from full wave rectified voltage V1, current i1 has a similar waveform as that of voltage V1. In IC 103, voltage V6 is coupled to an input of an over-load comparator 103d. When, under over-load condition, voltage V6 is sufficiently large to trigger comparator 103d, a HIGH-to-LOW transition occurs in signal V9. Thus, voltage V6 determines the maximum pulse-width of signal V9 that can be produced under the over-load condition. It follows that voltage V6 determines the maximum power that can be provided by SMPS 100.

The rate of change or peak level of voltage V6 varies during the period of voltage V1 such that when voltage V1 is at a minimum, the upper limit of the pulse-width of signal V9, before an over-load condition occurs, is larger than when voltage V1 is at a maximum. In this way, for a given upper limit of the pulse width of signal V9, occurring at the peak of voltage V1, an even larger pulse-width of the pulse of signal V9 and, therefore, a larger regulation range is obtained remote from the peak of voltage V1.

In IC 103, voltage V6 is coupled to an input of stop comparator 103c. In normal operation, voltage V6, in addition to voltage V30, controls the pulse-width of signal V9. The result is that when voltage V1 is at its peak, voltage V6 causes the pulse-width of signal V9 to be smaller than when voltage V1 is smaller than the peak. In this way, the pulse-width of signal V9 is modulated in a feed-forward manner via voltage V6. Advantageously, the feed-forward manner results in a reduction of the ripple voltage in output voltages V4, V5, V8 and V3.

When SMPS 100 is used in a television receiver, a signal ON/OFF determines when the television receiver is required to operate in a standby mode of operation and when in normal operation mode. The magnitudes of the load coupled to winding W4 and energized by SMPS 100 is determined by on/off control signal ON/OFF, that is produced in, for example, a microprocessor, not shown. Signal ON/OFF is referenced to the cold ground conductor G.

Detection of the standby mode of operation, activated by signal ON/OFF, is performed by a detector 31 that produces an on/off control signal V13 referenced to hot ground conductor H. In the standby mode of operation, the magnitude of the load coupled to windings W4 and W5 is substantially smaller than in normal operation. Because of decreased load, an increase in sense voltage V30 tends to occur in the standby mode. Therefore, IC 103 decreases the pulse-width of signal V9. Also, the frequency of signal V9 increases to the resonance frequency of flyback transformer T, around 100 KHz.

Detector 31 is responsive to the pulses in winding W3 that are determined by signal V9 and detects the magnitude of the loads coupled to windings W4 and W5 in accordance with the frequency of the pulses in winding W3. The pulses in winding W3 are coupled, in detector 31, via a low pass filter that is formed by a resistor 32 and a capacitor 33, to a rectifier 34. Thus, rectifier 34 produces in a capacitor 35 a DC voltage representative of the length of the interval between transition edges of the pulses in winding W3.

In the standby mode of operation, winding W3 supplies an almost sinusoidal voltage at 100 KHz. This voltage is attenuated by the low pass filter formed by resistor 32 and capacitor 33. Therefore, the voltage in capacitor 35 becomes insufficiently small to turn-on an output transistor 36 of detector 31. The result is that signal V13 is at the HIGH level. On the other hand, in the normal mode of operation, the frequency is lower and transistor 36 is maintained continuously conductive and signal V13 is at the LOW level. In this way, frequency detector 31 produces signal V13 referenced to hot ground H that is indicative of standby/normal mode of operation.

Signal V13 is coupled via a diode D14 to the base of transistor Q3. Signal V13 causes transistor Q3 to conduct regardless of the level of signal V9. Therefore, transistor Q2 is turned off, during standby, and current ip2 is zero. In this case, DC current flows through resistors R8 and R12 and via transistor Q3 to ground. Resistor R12 that is a positive temperature coefficient resistor heats and increases considerably in value. Thus, the losses in resistor R8 are further decreased, during standby. The overall circuit dissipation is further reduced because transistor Q2 is always turned off, during standby. Using this technique has two advantages. Firstly, standby input power is reduced from 14 watts to 10 watts. Secondly, during Standby, the harmonics are significantly reduced because there is only current ip1 current component.

During the standby mode of operation, voltages V3, V4 and V5 are also regulated. However, because of leakage inductance, the ratio between sense voltage V30 and output voltage V4 is such that voltage V4 tends to be larger, in standby, than in normal mode of operation. Such increase in voltage V4 that energizes output stage 37 may be undesirable because of increased component stress.

On/off control signal V13 is coupled via a series arrangement of a resistor 38 and a diode 39 to the sense input terminal, pin 1, of IC 103 for increasing the level of sense voltage V30. As a result, the duty cycle of signal V9 decreases. Consequently, advantageously, voltage V4 is decreased relative to what it would have been without the effect of the signal that is coupled via diode 39. For example, the value of circuit components can be selected in such a way that voltage V4 becomes, in standby, even smaller than in normal mode of operation.

Figure 4:
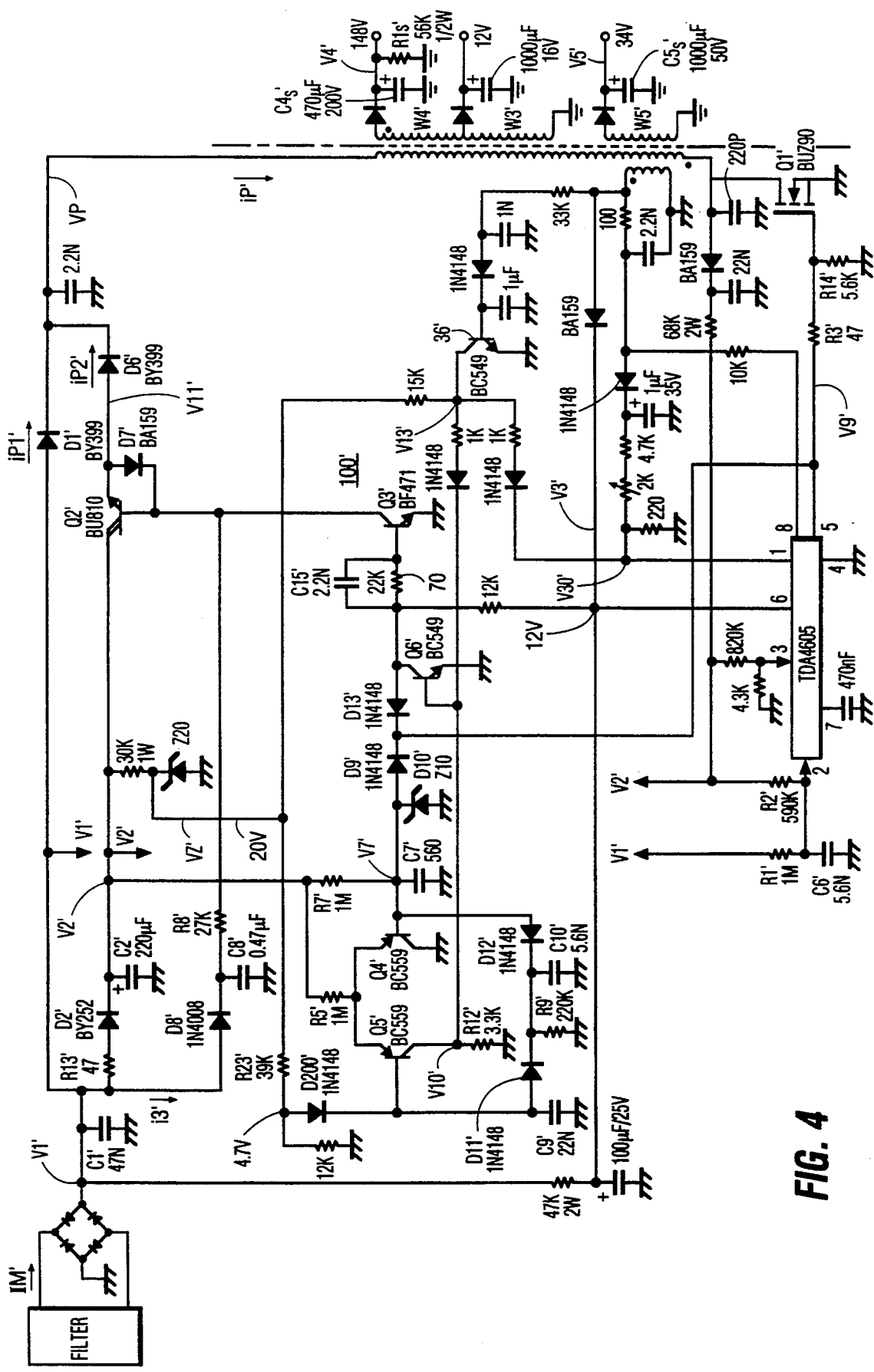
FIG. 4 illustrates a second embodiment of the invention.
Figure 5A:
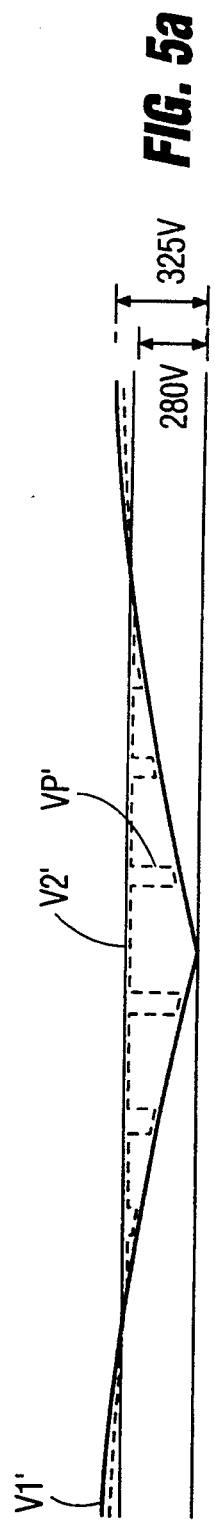
FIGS. 5a–5e illustrate waveforms useful for explaining the operation of the arrangement of FIG. 4.
Figure 5B:
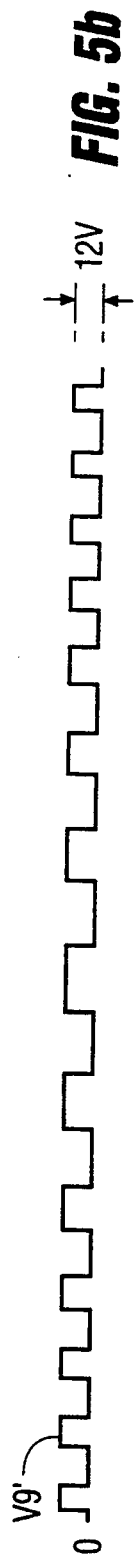
Figure 5C:
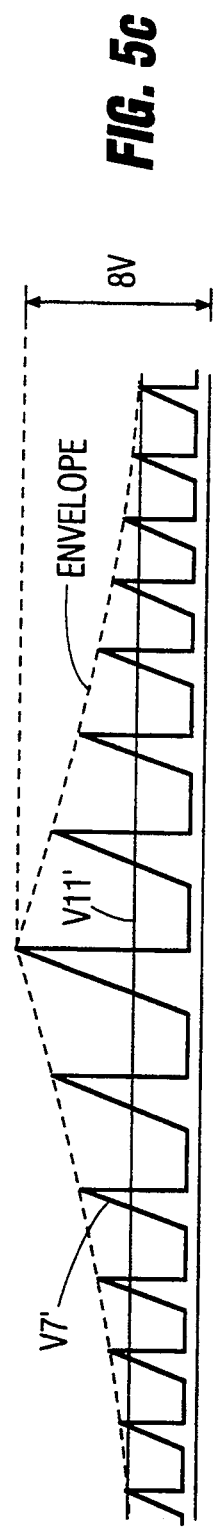
Figure 5D:
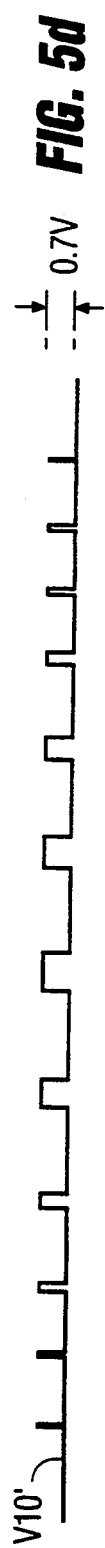
Figure 5E:
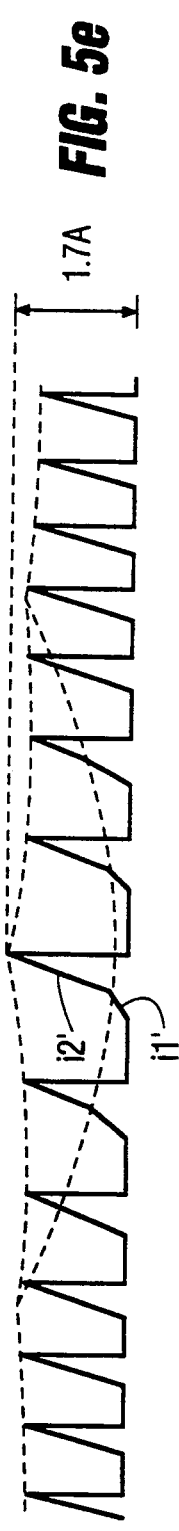

FIG. 4 illustrates a second embodiment of the invention that is similar to that of FIG. 1 with the differences noted below. FIGS. 5a–5e illustrate waveforms useful for explaining the operation the circuit of FIG. 4. Similar symbols and numerals in FIGS. 1, 2a–2h, 3a–3c, 4 and 5a–5e indicate similar items or functions except that the symbol prime (') is added in FIG. 4 for the corresponding element. In SMPS 100' of FIG. 4, transistor Q2' is a bipolar transistor. The base current for transistor Q2' is supplied via a half-wave rectifier diode D8' and a base resistor R8'. Signal V10' is derived from the collector of transistor Q5' and coupled to the base of transistor Q3' via an inverter stage formed by a transistor Q6'. The collector voltage of transistor Q6' is relatively large when turn on of transistor Q3 is required. Therefore, a base resistor 70' may be a relatively large resistor. Advantageously, because resistor 70' may be large, the circuit is less sensitive to tolerances in the level of signal V9' when signal V9' is at the LOW level and transistor Q3' is required to be turned off.

Increased loading causes a larger voltage drop across resistor R13'. Therefore, the base voltage of transistor Q2' also decreases when transistor Q2' is turned on. Advantageously, the base current also increases because of the decrease in the base voltage. The increase in the base current is desirable for maintaining transistor Q2' in saturation when its collector current increases. Signal V13' is coupled to the base of transistor Q6' to turn on transistor Q6' in the standby mode.

When a short circuit condition occurs in the load, not shown, the voltage across winding W3' is zero. Therefore, transistor 36' is turned off. The result is an increase in voltage V30' that tends to decrease the duty cycle of signal V9' so as to provide short circuit protection.

When loading of the power supply becomes smaller than a predetermined value, for example, 80 watts, a diode 200' that is coupled to the base of transistor Q5' clamps the base voltage of transistor Q5' to 4 volts. Thus, the base voltage of transistor Q5' cannot decrease below that level. Therefore, diode 200' establishes a maximum value for the conduction interval or maximum duty cycle of transistor Q2' at low loading. Thus, advantageously, the power factor that is determined by current i3' does not decrease when the loading further decreases. By providing upper limit to the duty cycle of transistor Q2', the value of resistor R13' can be smaller than if the maximum duty cycle of transistor Q2' could further increase when the load decreases. Therefore, advantageously, the power dissipation in resistor R13' can be made lower than if the clamping operation of diode 200' were not employed. Advantageously, the duty cycle upper limitation of transistor Q2' does not cause an increase in a ripple voltage at the output of the power supply because filter capacitors at the output of the power supply, are sufficiently large to reduce ripple at low loading.

Figure 6:
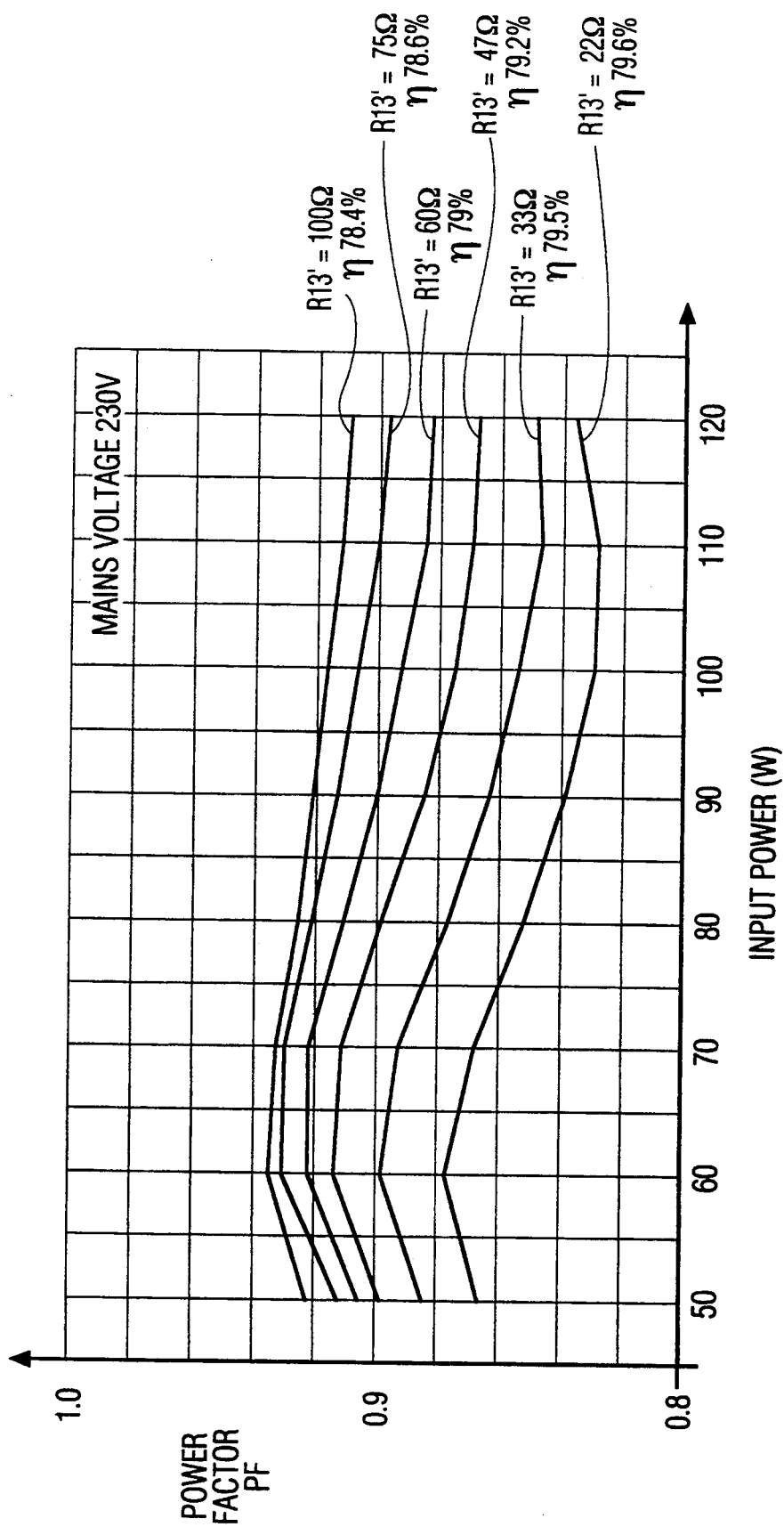
FIG. 6 illustrates a graph providing the input power factor in the arrangement of FIG. 4.

In FIG. 6, a family of graphs shows the variation of the power factor for different values of resistor R13' of FIG. 4, as a function of the input power to the power supply. The efficiency factor $\eta$ at an input power of 100W for different values of resistor R13' is also provided.

Figure 7:
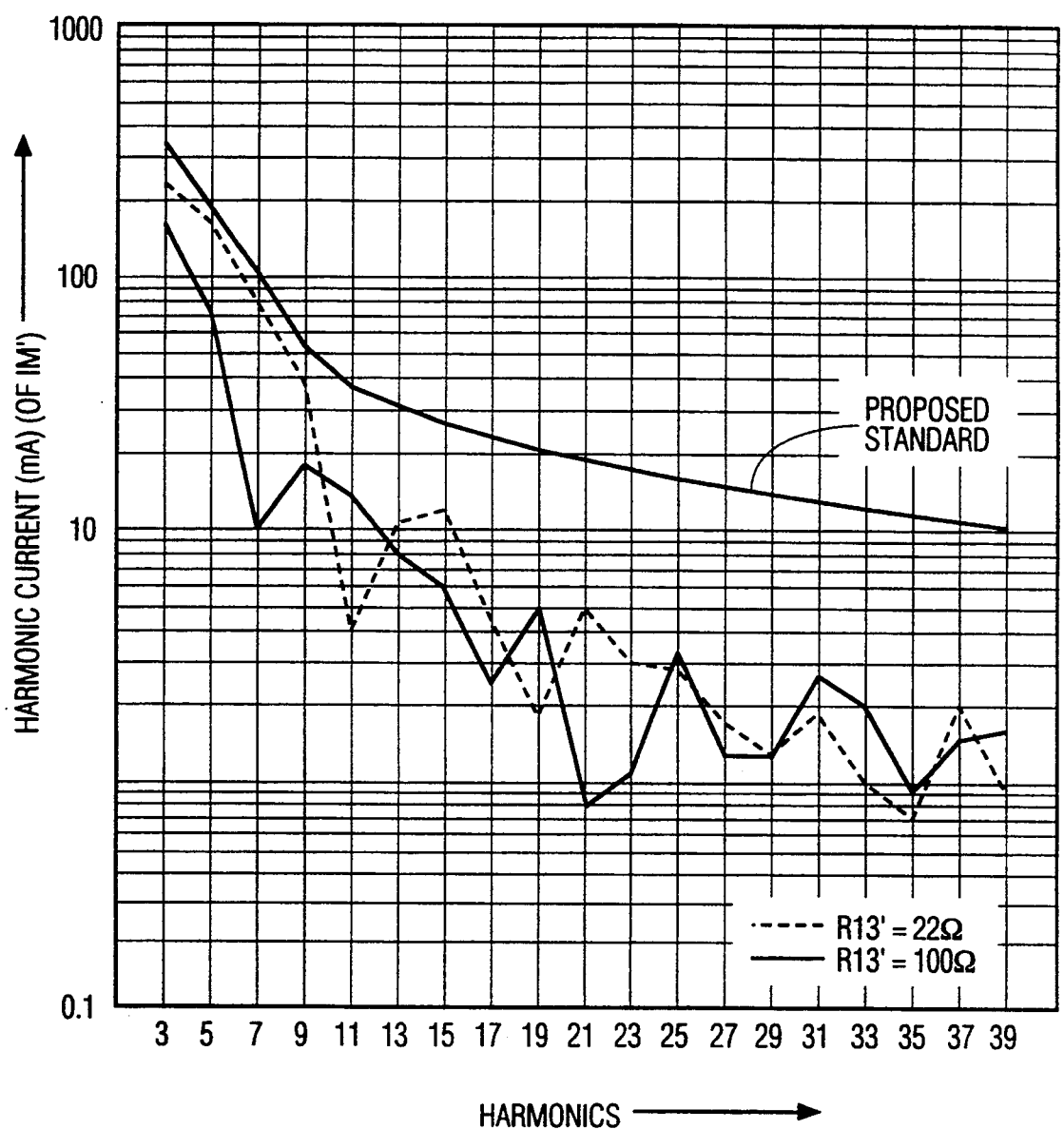
FIG. 7 illustrates a graph providing the harmonics content of the input current in the arrangement of FIG. 4.

In FIG. 7, a family of graphs shows the harmonics contents of input current IM' of FIG. 4 when resistor R13' is equal to 22 Ohm and when it is equal to 100 Ohm. For comparison purposes, the maximum allowed harmonics content in what is believed to be the proposed standard is also shown.

What is claimed is:

1. A switch mode power supply, comprising:
   a source of an AC, mains supply voltage;
   a first rectifier coupled to said mains source for rectifying said mains supply voltage without filtering out a low frequency component at a frequency related to that of said mains supply voltage to develop an unfiltered, rectified, first supply voltage;
   first switching means responsive to a first switching signal and coupled to an inductance having applied thereto said first supply voltage for developing a first plurality of current pulses at a frequency that is substantially higher than that of said mains supply voltage, said first plurality of current pulses being coupled via a second rectifier to produce a first portion of a rectified output supply current;

a filter capacitor;

a third rectifier coupled to said mains source and to said capacitor for rectifying said mains supply voltage to develop current pulses in said capacitor for producing a rectified, second supply voltage in said capacitor;

second switching means coupled to said second supply voltage and responsive to a second switching signal for developing in an inductance that is coupled to said capacitor a second plurality of current pulses at a frequency that is substantially higher than that of said mains supply voltage, said second plurality of current pulses being coupled via a rectifier to produce a second portion of said output supply current; and means coupled to said capacitor for lengthening a pulse-width and decreasing a peak amplitude of a given current pulse in said capacitor.

2. A power supply according to claim 1 wherein said pulse-width interval lengthening means comprises a resistor that is coupled in series with said capacitor.

3. A power supply according to claim 2 wherein said first plurality of current pulses are developed in a current path that bypasses said resistor.

4. A power supply according to claim 1 further comprising, a pulse-width modulator responsive to a feedback signal for pulse-width modulating current pulses of one of said first and second pluralities of current pulses.

5. A power supply according to claim 1 wherein said inductance comprises a winding of a flyback transformer.

6. A power supply according to claim 1 wherein the absence of low frequency component filtering prevents said first plurality of current pulses from causing a significant increase of said harmonic content in said mains input supply current.

7. A power supply according to claim 1 wherein said second plurality of current pulses reduces a ripple component in an output of said power supply.

8. A power supply according to claim 1 wherein said capacitor current pulses tend to increase a harmonic content in a mains input supply current and reduce a power factor and wherein said peak amplitude decreasing means decreases the tendency of said capacitor current pulses to increase said harmonic content in said mains input supply current and increases said power factor.

9. A power supply according to claim 1 wherein each of said first and second pluralities of current pulses occur at least during a portion of said period of said mains supply voltage when said first supply voltage is at a substantially smaller magnitude than a peak magnitude thereof.

10. A power supply according to claim 1 wherein said capacitor current pulses occur at a low frequency that is related to said frequency of said mains supply voltage and that is substantially lower than that of said first plurality of current pulses.

11. A switch mode power supply, comprising:
a source of an AC, mains supply voltage and an AC, mains supply current;
a filter capacitor;
a first rectifier coupled to said mains source and to said capacitor for rectifying said mains supply voltage to develop current pulses in said capacitor at a frequency that is related to said frequency of said mains supply voltage for producing a second supply voltage at a terminal of said capacitor, said capacitor current pulses producing a distortion in said mains supply current that tends to decrease a power factor associated with said mains source;

means coupled to said capacitor for lengthening a pulse-width of a given current pulse and for decreasing a peak amplitude of said given current pulse so as to reduce the distortion and increase the power factor;

first switching means responsive to a first switching signal for generating in an inductance that is coupled to said mains source, a first plurality of current pulses at a substantially higher frequency than said frequency of said mains supply voltage, said first plurality of current pulses being coupled via a rectifier to produce a first portion of a rectified output supply current, said first plurality of current pulses having magnitudes that vary during a period of said mains supply voltage in accordance therewith in a manner to increase said power factor; and second switching means responsive to a second switching signal for generating, in an inductance that is coupled to said terminal where said second supply voltage is developed, a second plurality of current pulses at a substantially higher frequency than said frequency of said mains supply voltage, said second plurality of current pulses being coupled via a rectifier to produce a second portion of said rectified output supply current, in a manner to reduce a ripple component at an output of said power supply.

12. A power supply according to claim 11 wherein a given current pulse of said second plurality of current pulses occurs closely to a corresponding current pulse of said first plurality of current pulses.

13. A power supply according to claim 12 wherein a ratio between magnitudes of first plurality of current pulses and magnitudes of said second plurality of current pulses varies, during said period.

14. A power supply according to claim 11 wherein said first and second pluralities of current pulses are generated in a transformer and transformer-coupled therethrough to a load circuit.

15. A power supply according to claim 11 wherein said first and second pluralities of current pulses are generated in the same winding of said transformer.

16. A power supply according to claim 11 wherein a ratio between a magnitude of said mains supply voltage and a magnitude of a current pulse of said first plurality of current pulses that occurs when said mains supply voltage is at a peak value is approximately the same as a ratio between a magnitude of said mains supply voltage and a current pulse of said first plurality of current pulses that occurs when said magnitude of said mains supply voltage is substantially smaller than said peak value.

17. A power supply according to claim 11 further comprising, means responsive to a control signal that varies during said period of said mains supply voltage for varying magnitudes of said second plurality of current pulses, during said period of said mains supply voltage, in a manner to reduce said ripple.

18. A power supply according to claim 11 wherein a current path of said first plurality of current pulses excludes said terminal where said second supply voltage is developed.

19. A power supply according to claim 11 wherein said first plurality of current pulse generating means comprises a rectifier coupled to said mains source for rectifying said mains supply voltage without filtering out low frequency harmonic components of said rectified mains supply voltage from said rectified mains supply voltage such that variations of said rectified mains supply voltage during said period produce amplitude modulation in said first plurality of current pulses.

20. A power supply according to claim 11 further comprising, a pulse-width modulator responsive to a feedback signal that is indicative of said ripple component for varying said magnitudes of second plurality of current pulses, during said period, in a manner to reduce said ripple component.

21. A power supply according to claim 11 further comprising a pulse-width modulator responsive to a feedback signal for pulse-width modulating said first plurality of current pulses to provide output supply regulation.

22. A power supply according to claim 11 further comprising a pulse width modulator responsive to a feedback signal for varying magnitudes of said first plurality and of said second plurality of current pulses in the same direction in a manner to provide output supply regulation.

23. A power supply according to claim 11 wherein current pulses of said first plurality of current pulses occur in one of a current interleaving manner and a current superposition manner with respect to current pulses of said second plurality of current pulses.

24. A switch mode power supply, comprising:
a source of an AC, mains supply voltage;
a filter capacitor;
a first rectifier coupled to said mains source and to said capacitor for rectifying said mains supply voltage to develop current pulses in said capacitor for producing a rectified, first supply voltage in said capacitor;
means coupled to said capacitor for lengthening a pulse-width and decreasing a peak amplitude of a given current pulse in said capacitor;
first switching means coupled to said first supply voltage and responsive to a first switching signal for developing in an inductance that is coupled to said capacitor a first plurality of current pulses at a frequency that is substantially higher than that of said mains supply voltage, said first plurality of current pulses being coupled via a rectifier to produce a first portion of a rectified output supply current;
a second rectifier coupled to said mains source for rectifying said mains supply voltage to develop a rectified, second supply voltage; and
second switching means responsive to a second switching signal and coupled to an inductance having applied thereto said second supply voltage for developing a second plurality of current pulses at a frequency that is substantially higher than that of said mains supply voltage via a current path that bypasses said capacitor, said second plurality of current pulses being coupled via a second rectifier to produce a second portion of said rectified output supply current.

* * * * *